(12) United States Patent
Rutherford et al.

(10) Patent No.: US 6,566,884 B2
(45) Date of Patent: May 20, 2003

(54) IONIZATION VACUUM PRESSURE GAUGE

(75) Inventors: Sherman L. Rutherford, Portola Valley, CA (US); Ronald M. Paitich, Auburn, CA (US); Frederick P. Brechtel, Hayward, CA (US); Robert J. Espinosa, Campbell, CA (US)

(73) Assignee: Duniway Stockroom Corporation, Mountain View, CA (US)

( * ) Notice: Subject to any disclaimer, the term of this patent is extended or adjusted under 35 U.S.C. 154(b) by 0 days.

(21) Appl. No.: 09/951,235

(22) Filed: Sep. 13, 2001

(65) Prior Publication Data

US 2003/0057953 A1 Mar. 27, 2003

(51) Int. Cl.[7] .............................................. G01L 21/30
(52) U.S. Cl. ..................................................... 324/460
(58) Field of Search .................................. 324/459, 460, 324/463, 464; 73/700; 313/336, 346 R

(56) References Cited

U.S. PATENT DOCUMENTS

| | | | | |
|---|---|---|---|---|
| 4,755,669 A | * | 7/1988 | Grant et al. ................. | 250/281 |
| 5,278,510 A | | 1/1994 | Baptist et al. .............. | 324/460 |
| 5,767,629 A | * | 6/1998 | Baptist et al. .............. | 315/168 |
| 2001/0011890 A1 | * | 8/2001 | Kawasaki ................... | 324/460 |

OTHER PUBLICATIONS

"The Handbook of Vacuum Science and Technology" Ed. Dorothy M. Hoffman, Academic Press, 1998 pp. 272–288.

* cited by examiner

Primary Examiner—Christine Oda
Assistant Examiner—Whitney V. Myers
(74) Attorney, Agent, or Firm—Dorsey & Whitney LLP

(57) ABSTRACT

There is described a vacuum gauge in which an anode grid defines an ionization volume directly into which electrons are injected where they collide with gas molecules and atoms to form ions. A collector electrode is mounted within the ionization volume.

6 Claims, 4 Drawing Sheets

IONIZATION VACUUM PRESSURE GAUGE

BRIEF DESCRIPTION OF THE INVENTION

This invention relates generally to an ionization vacuum gauge, and more particularly to a vacuum gauge employing a cold electron source.

BACKGROUND OF THE INVENTION

Ionization vacuum pressure gauges have been built for more than fifty years. This type of gauge employs an electron source located radially outside of an ionization space defined by an anode. An ion collector electrode is disposed within the ionization space. The electrons travel from the source toward and through the anode, and are eventually collected by the anode. However, in their travel, the electrons impact the molecules and atoms of gas, constituting the atmosphere whose pressure is to be measured, and create ions. The ions are attracted by the collector electrode. The pressure of the gas within the atmosphere can be calculated by the formula $P=(1/k)(I_{ion}/I_{electron})$, where k is a constant with the units of 1/torr and is characteristic of a particular gauge geometry and electrical parameters.

One conventional prior art ionization vacuum gauge employs a hot filament for generating the ions. FIG. 1 is a schematic perspective illustration of such a prior art vacuum gauge. The ion gauge is disposed within an enclosure 11 whose pressure is to be measured. The gauge includes a heated filament 12 which emits the electrons, an anode grid 13 which accelerates the electrons and an ion collector 14 which collects ions formed by electron/molecule collisions. In the example, the anode grid is in the form of a wire spiral or screen which defines the ionization space and surrounds the collector. Ions are formed by collision of the electrons with the gas atoms or molecules within the enclosure whose pressure is being measured. Pressure is measured by collecting the ions, measuring the resulting electrical current and calculating the pressure as described above.

While this type of prior art vacuum gauge has been used successfully for many years, it has disadvantages and shortcomings. The hot filament requires several watts of electrical power which is dissipated as heat in the vacuum system. This heat changes the rate at which gas molecules are desorbed from the surfaces of the various structures in the vacuum system. It also changes the nature of the residual gases in the vacuum system by providing a hot source where gas molecules react by dissociation. When the hot ionization gauge is turned on in a high vacuum system, both the level and makeup of the vacuum pressure are disturbed as long as the gauge is operated. The radial location of the hot filament provides a dimensional limitation for the insertion of the gauge into the vacuum system. The hot source must not contact the port or tube into which the gauge is inserted and its proximity to the walls of the tube or port encourage excessive heating by radiation. The accuracy of the geometric relationship of the heated filament with the other gauge elements is difficult to maintain, because the filament can easily bend. This influences the accuracy of the measurements being made by the gauge. The high temperature of the filament causes evaporation which can give rise to undesirable coating of sensitive electrical components, such as insulators. In some cases, where the filament is coated with an active metal oxide, such as thorium oxide, certain materials, such as hydrocarbons, can give rise to 'poisoning' of the filament by dissociation and deposit of carbonaceous coatings. These residues change the electrical characteristics of the filament, making it unsuitable for its intended purpose. In other cases, where the filament is made of tungsten, exposure to high pressures of oxygen can cause destructive oxidation leading to burn-out.

U.S. Pat. No. 5,278,510 discloses a vacuum gauge which overcomes many of the drawbacks of the heated filament vacuum gauge. In this gauge, the heated filament electron source 12 is replaced by a cold micropoint electron source 16. FIG. 2 shows such a gauge where reference numerals have been applied to like parts. The cold source is radially mounted outside the ionizing space. This gives rise to the same geometric limitations as the hot filament electron sources.

OBJECTS AND SUMMARY OF THE INVENTION

It is an object of the present invention to provide an improved ionization vacuum pressure gauge.

The vacuum gauge includes an anode which defines an ionization space supported by a support. A cold electron source projects electrons axially directly through the support into the ionization space. An ion collector is supported within the ionization space.

BRIEF DESCRIPTION OF THE DRAWINGS

The invention will be more clearly understood from the following description when read in connection with the following drawings in which.

DESCRIPTION OF THE PREFERRED EMBODIMENT

Figure 1:
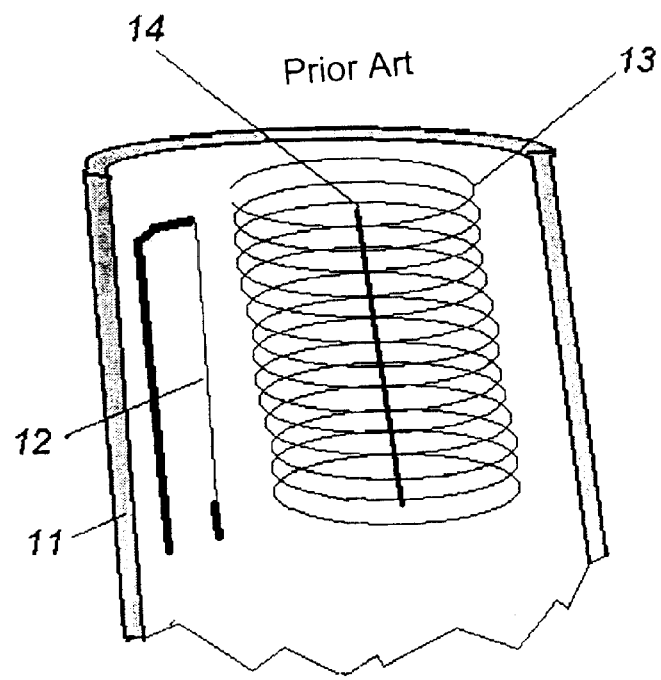
FIGS. 1 and 2 are schematic perspective views of prior art vacuum ionization gauges of the type discussed above.
Figure 2:
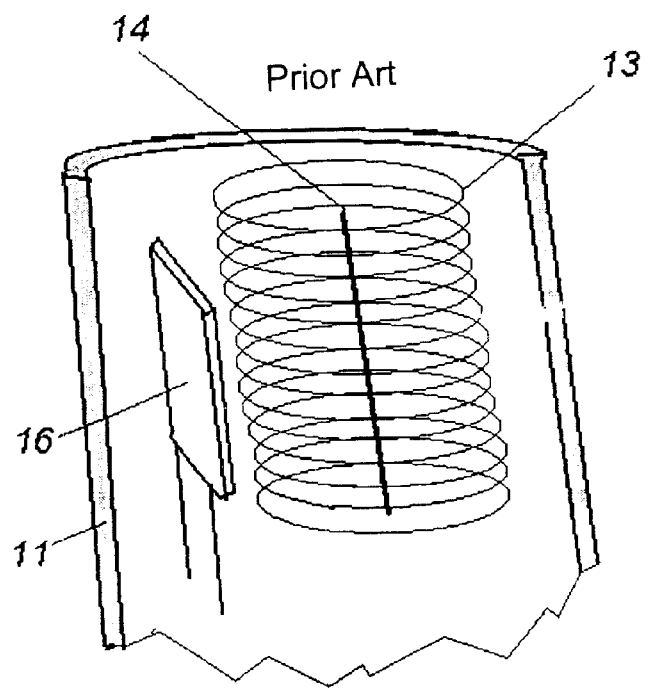
Figure 3:
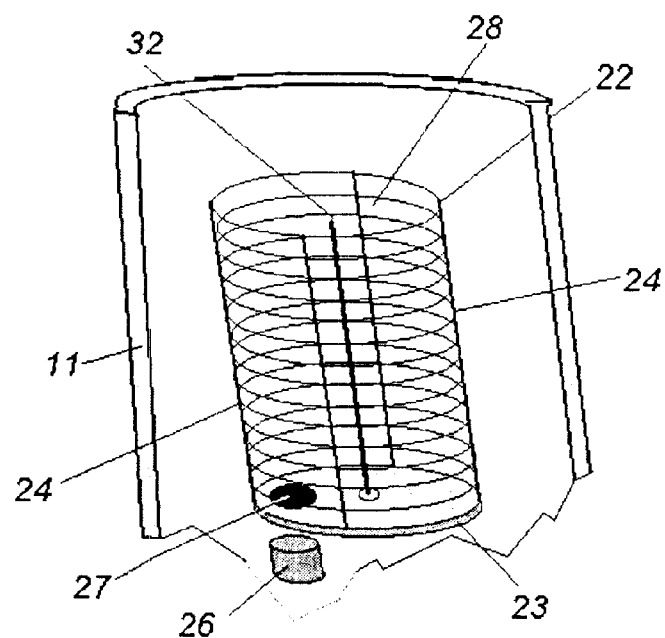
FIG. 3 is a schematic perspective view of a vacuum gauge in accordance with the present invention.

Referring to the figures, the vacuum gauge of the present invention includes an anode grid 22 which is highly transparent to the gas molecules making up the atmosphere of the enclosure, and which is supported on a grid base 23. The grid may be wire wound in the form of a helix or a screen structure supported from the base 23 by support wires 24. The cold electron source 26 is suitably mounted in cooperative relation to the opening 27 in the base 23 and positioned so that it emits electrons axially into the ionization space 28 defined by the anode grid 22. The cold electron source, the preferred embodiment of which is described below, includes an electron emitter assembly 29 and an electron extractor grid 31. By application of a high positive voltage between the extractor grid and the electron emitter, electrons are drawn from the source and projected into the ionization space 28. The electrons travel axially and then follow spiral paths outwardly to the anode grid. In their flight, they collide with molecules and atoms in the atmosphere to generate ions. An ion collector electrode 32 is located within the anode and maintained at ground potential where it attracts positive ions formed by the collision between the energetic electrons and the molecules or atoms.

Figure 4:
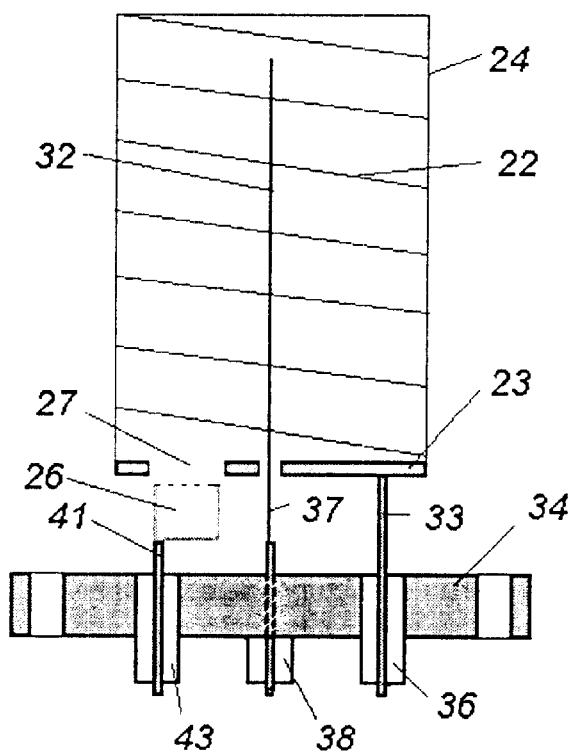
FIG. 4 is a sectional view of a vacuum gauge in accordance with the present invention, taken generally along the line 4—4 of FIG. 5.
Figure 5:
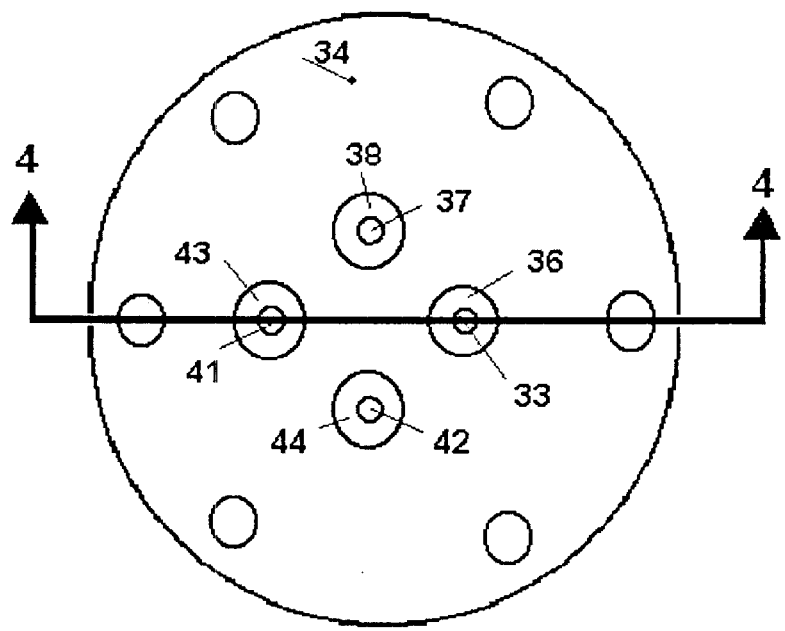
FIG. 5 is a bottom view of the vacuum gauge of FIG. 4.
Figure 6:
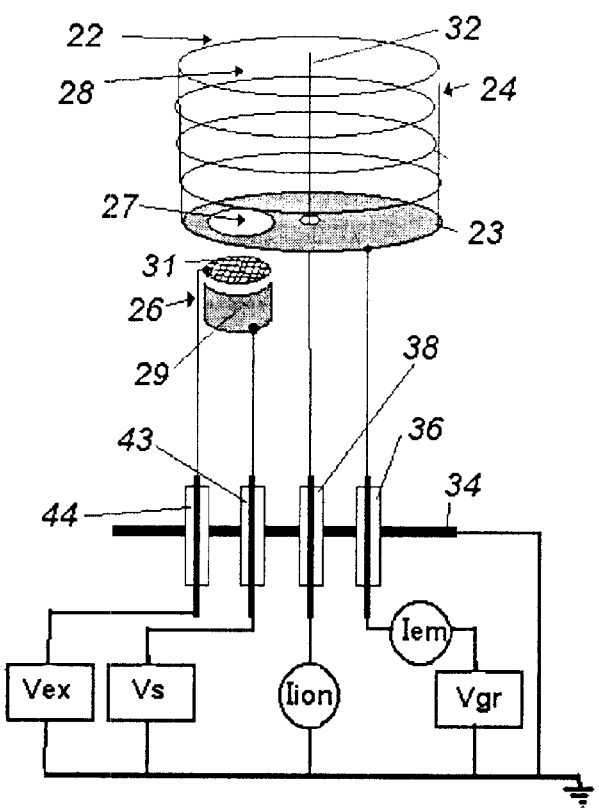
FIG. 6 is a schematic view of the vacuum gauge with operating voltages and current shown connected to the vacuum gauge elements.

The base is supported from flange 34 by a conductor 33, FIG. 4, which extends through a flange 34 and is used to mount the vacuum gauge assembly to the enclosure whose vacuum is to be measured. The conductor is supported by an insulating sleeve 36 which extends through the flange and is sealed to the conductor and flange to provide a vacuum-sealed lead-through. The collector electrode 32 is supported by conductor 37 which is supported from the flange by the insulating sleeve 38 which forms a lead-through. Conductors 41 and 42 are connected to the cold electron emission source 29 and extractor electrode 31, respectively, and may serve as supports for the cold electron source assembly. They too are supported by insulators 43 and 44 which form vacuum sealed lead-throughs.

Figure 7:
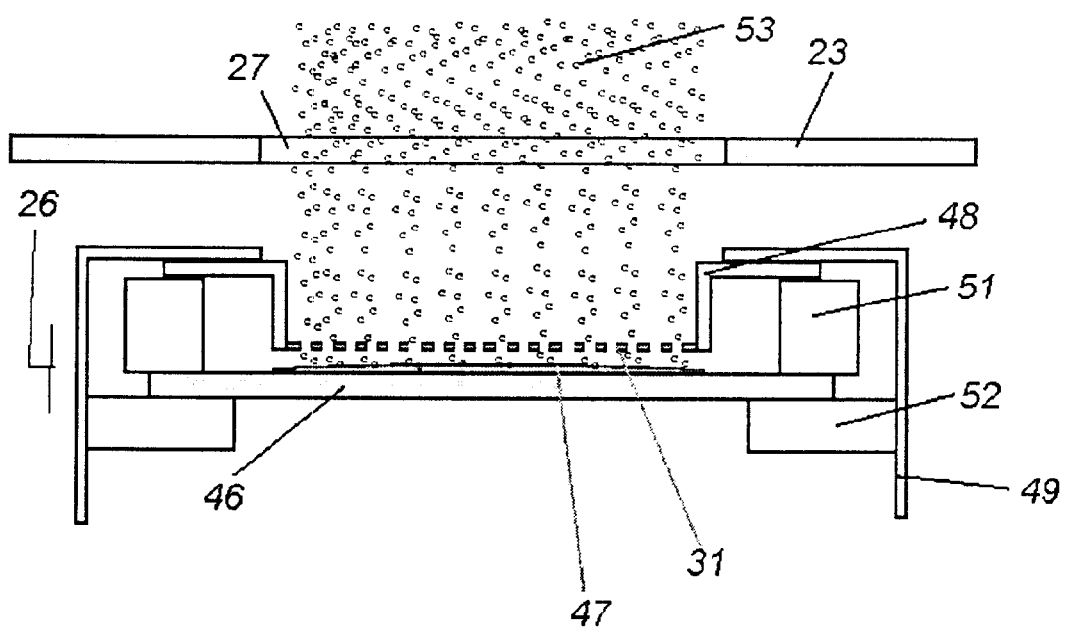
FIG. 7 shows a suitable cold electron source.

FIG. 7 shows a preferred cold electron source 26. The electron source 26 includes an electron emitter substrate 46 which may be metal, ceramic, glass or semiconductor material coated with a nanostructured carbon electron-emitting film 47. Nanostructured carbon films are composed of nanocrystalline graphite, carbon nanotubes, diamond, diamond-like carbon or a composite of two or more of the above. The films are formed by deposition from a plasma formed from a gas mixture which contains at least one hydrocarbon gas.

The extraction grid 31 is supported closely adjacent the nanostructured carbon film. The grid 31 is supported by a grid support 48 attached to a sleeve 49. The spacing of the grid 31 and the film 47 is maintained by a ceramic insulating spacer 51 disposed between the substrate 46 and the support 48. The substrate 46 is supported by a ceramic ring 52 secured to the sleeve 49.

An electric field is applied between the nanostructured carbon film 47 and extractor grid 31 to cause emission of electrons. The electron emission mechanism is electric field assisted tunneling at the nanostructured carbon film surface (field emission), which has the characteristic that the density of the emitted current is determined solely by the electric field at the emitter surface. Since the emitted current is independent of temperature, the full current capacity of the emitter is available at room temperature, hence, it is termed a cold electron emitter. Current is emitted from the nanostructured carbon film surface when the electric field at the emitter surface exceeds a certain value, termed the threshold field. The emitted current increases as the electric field is increased above the threshold value. Although a preferred cold electron source has been described, other sources can be used in the stable configuration of the inventive vacuum gauge.

The emitted electrons 53 are accelerated by the voltage on the extraction grid and travel through the grid, and are projected axially through the opening 27 in the base 23 into the ionization space 28, where they travel axially and follow spiral paths radially outwardly and are collected by the grid.

Referring to FIG. 7, operating voltages $V_s$ and $V_{ex}$ are applied between the electron emitter film and the extraction grid, respectively. A voltage $V_{gr}$ is applied to the anode grid. The electron current $I_{em}$ and the ion current $I_{ion}$ are measured. The measured currents are processed as described above to provide a measure of the vacuum. The smaller the ion current, the higher the vacuum.

As the electrons travel axially and follow spiral outward paths in the ionization space, they collide with gas atoms and molecules to form ions which are collected by the collector electrode. The ionization vacuum gauge is very stable in that the position of the ion source is fixed with respect to the anode grid. Since the electron source is mounted axially, the anode grid structure can be increased in volume in the radial direction, providing more volume for ionization space. This increases the likelihood that electrons will collide with gas molecules, creating ions which will be collected by the ion collector, and thus increases the sensitivity of the vacuum ionization gauge.

The foregoing descriptions of specific embodiments of the present invention are presented for the purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An ionization vacuum pressure gauge for placement in a low-pressure atmosphere whose pressure it is desired to measure, comprising:
    an anode grid defining an ionization space,
    a cold electron source for generating electrons and supplying them from within the ionization space where they are attracted by the anode grid, said electrons colliding with gas molecules and atoms in the ionization space to form ions, and
    a collector within said ionization space for collecting said ions.

2. An ionization vacuum pressure gauge comprising:
    an elongated anode grid defining an ionization space having an axis,
    a cold electron source for emitting electrons into the ionization space in the axial direction whereby they travel in an axial direction and then radially to said anode grid, said electrons impacting gas molecules and atoms to form ions as they travel from the cold electron source to the anode grid; and
    a collector electrode extending within said anode grid for collecting the ions.

3. An ionization vacuum pressure gauge as in claim 2 wherein said cold electron source includes an electron-emitting surface and an extraction grid for extracting electrons and directing them into the ionization space.

4. An ionization vacuum gauge for placement in a low-pressure atmosphere whose pressure is to be measured, comprising:
    a base having an opening,
    an anode grid supported on said base and configured to define an ionization space,
    a cold electron source for emitting electrons mounted in cooperative relation to said opening whereby the emitted electrons travel through said opening into said ionization space, and
    a collector within said ionization space for collecting ions.

5. An ionization vacuum gauge as in claim 4 wherein said anode grid is configured to define a cylindrical space and the collector is disposed in said cylindrical space.

6. An ionization gauge as in claim 4 or 5 including a flange for supporting the base and cold electron source and adapted to mount the ionization gauge in an evacuated enclosure.

* * * * *